United States Patent
Sang et al.

(10) Patent No.: US 12,304,551 B2
(45) Date of Patent: May 20, 2025

(54) STEERING WHEEL

(71) Applicant: Autoliv Development AB, Vargarda (SE)

(72) Inventors: Ruigang Sang, Shanghai (CN); Qi Lu, Shanghai (CN); Shuhao Wang, Shanghai (CN)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/293,192

(22) PCT Filed: Jun. 28, 2022

(86) PCT No.: PCT/CN2022/101909
§ 371 (c)(1),
(2) Date: Jan. 29, 2024

(87) PCT Pub. No.: WO2023/005571
PCT Pub. Date: Feb. 2, 2023

(65) Prior Publication Data
US 2024/0253689 A1 Aug. 1, 2024

(30) Foreign Application Priority Data
Jul. 30, 2021 (CN) .......................... 202121772080.4

(51) Int. Cl.
*B62D 1/06* (2006.01)
*B62D 1/10* (2006.01)

(52) U.S. Cl.
CPC ................. *B62D 1/06* (2013.01); *B62D 1/10* (2013.01)

(58) Field of Classification Search
None
See application file for complete search history.

(56) References Cited

U.S. PATENT DOCUMENTS

| 2,813,436 | A | | 11/1957 | Barenyi | |
| 4,752,085 | A | | 6/1988 | Yamamoto | |
| 10,501,108 | B2 | * | 12/2019 | Beauregard | B62D 1/04 |

FOREIGN PATENT DOCUMENTS

| CN | 111332355 | A | | 6/2020 | |
| CN | 215883789 | U | | 2/2022 | |
| CN | 115485179 | A | * | 12/2022 | B60R 21/203 |
| DE | 102016225297 | A1 | * | 6/2018 | B62D 1/10 |
| WO | 2018060443 | A1 | | 4/2018 | |

* cited by examiner

*Primary Examiner* — Vicky A Johnson
(74) *Attorney, Agent, or Firm* — Matthew D. Thayne; Thayne and Davis LLC

(57) ABSTRACT

A steering wheel, comprising a steering wheel rim and a steering wheel center support. The steering wheel rim is rotatable, and the steering wheel rim is mounted so as to be rotatable about a first axis of rotation. The steering wheel further comprises: a pivot shaft having a first end is fixedly connected to the steering wheel rim, pivoting of the pivot shaft about a second axis of rotation causes the steering wheel rim to rotate about the second axis of rotation; and a transmission mechanism, comprising a lead screw, a slider threadably engaged with the lead screw, and a connecting rod, the connecting rod being rotatably connected to the pivot shaft and the slider, and a driving force driving, via the lead screw, the slider, and the connecting rod, the pivot shaft to rotate about the second axis of rotation.

12 Claims, 3 Drawing Sheets

STEERING WHEEL

TECHNICAL FIELD

The present invention relates to a steering mechanism of a vehicle, and relates in particular to a steering wheel.

BACKGROUND

Motor vehicles are typically adjusted to a desired direction by means of front wheels thereof. A vehicle driver sets the desired direction by means of a steering wheel. To this end, a steering wheel rim is rotated such that the front wheels are directed towards the desired direction. The steering wheel rim is typically disposed in front of the chest of the vehicle driver so that the vehicle driver can grasp the steering wheel rim relatively easily. Meanwhile, the position of the steering wheel causes the driver to be limited in freedom of movement, and the driver cannot turn sideways in the seat or can only do so awkwardly. In addition, the driver is also adversely affected when getting into and out of the vehicle.

The degree of automation of vehicles today is increasingly higher so that the vehicles may move autonomously. Correspondingly, different levels of automation are distinguished for vehicles. For level 3 and above, which corresponds to highly automated driving, a driver does not need to monitor various systems for vehicle control. Thus, the driver may transfer their attention to matters of interest or have a rest. In this case, it is desirable that the steering wheel rim can be stowed to provide more space and comfort to the driver.

Accordingly, it is desirable to provide a stowable steering wheel having a simple structure and low costs.

SUMMARY

The objective of the present invention is to provide a stowable steering wheel having a simple structure and low costs.

Provided in the present invention is a steering wheel, comprising a steering wheel rim and a steering wheel center support, wherein the steering wheel rim is rotatable relative to the steering wheel center support, and the steering wheel rim is mounted so as to be rotatable about a first axis of rotation;
  wherein,
  the steering wheel further comprises,
  a pivot shaft, configured so that a first end is fixedly connected to the steering wheel rim so as to move together with the steering wheel rim, pivoting of the pivot shaft about a second axis of rotation causing the steering wheel rim to rotate about the second axis of rotation relative to the steering wheel center support, wherein the first axis of rotation is perpendicular to the second axis of rotation; and
  a transmission mechanism, comprising a lead screw, a slider, and a connecting rod, the slider being configured to be disposed on the lead screw by being threadedly engaged with the lead screw, one end of the connecting rod being relatively rotatably connected to a second end of the pivot shaft, the other end of the connecting rod being relatively rotatably connected to the slider, and a driving force driving, via the lead screw, the slider, and the connecting rod, the pivot shaft to rotate about the second axis of rotation.

According to an embodiment of the present invention, the transmission mechanism comprises a transmission shaft for receiving a driving force, the transmission shaft being drivingly connected to the lead screw, and axes thereof not being parallel.

According to an embodiment of the present invention, two lead screws are provided, and are respectively drivingly connected to the transmission shaft at two shaft ends thereof by means of a bevel gear pair.

According to an embodiment of the present invention, the steering wheel center support is provided with a box body for accommodating the transmission mechanism, and the pivot shaft is located at an outer side of the box body.

According to an embodiment of the present invention, the transmission mechanism further comprises a guide shaft arranged to be parallel to a lead screw, and the slider comprises a first engagement hole and a second engagement hole, wherein the first engagement hole is configured to be a threaded hole so as to be threadedly engaged with the lead screw, and the second engagement hole is configured to traverse the guide shaft.

According to an embodiment of the present invention, the transmission mechanism further comprises a worm gear and a worm, the worm gear being configured to be drivingly connected to an output shaft of a driving apparatus, and the worm being used as the transmission shaft.

According to an embodiment of the present invention, the transmission mechanism further comprises a guide rail arranged to be parallel to a lead screw, and the slider comprises a first engagement hole and a first opening, wherein the first engagement hole is configured to be a threaded hole so as to be threadedly engaged with the lead screw, and the first opening is configured to be disposed on a side surface of the guide rail in a shape interlocking manner.

According to an embodiment of the present invention, a driving apparatus is disposed on an outer top surface of the box body.

According to an embodiment of the present invention, the steering wheel further comprises side plates disposed on the outer top surface of the box body, and each side plate is provided with a track for movement of the second end of the pivot shaft.

According to an embodiment of the present invention, the steering wheel further comprises a fixed shaft disposed to be parallel to the pivot shaft, one end of the fixed shaft being fixed on the steering wheel rim, and the other end relatively rotatably extending into a positioning hole in a side plate.

According to an embodiment of the present invention, the fixed shaft is configured to be a hollow shaft.

According to an embodiment of the present invention, two lead screws are provided, and are each driven at the shaft end by a double-head motor.

In the steering wheel of the present invention, by means of configuring the lead screw-slider-connecting rod to transmit a driving force to the pivot shaft, rotation of the steering wheel rim may be achieved. The steering wheel of the present invention is stowable and has a simple structure and low costs.

DETAILED DESCRIPTION

Figure 1:
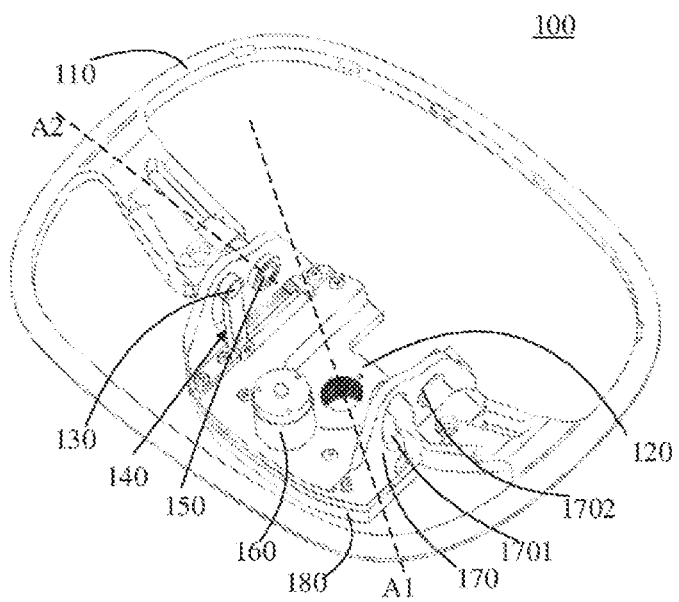
FIG. 1 schematically illustrates a steering wheel according to an embodiment of the present invention.

Specific implementations of a steering wheel according to the present invention will be described below with reference to the accompanying drawings. The following detailed description and the accompanying drawings are used to illustratively explain the principles of the present invention. The present invention is not limited to the described preferred embodiments, and the scope of protection of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

It is understood that the steering wheel of the present invention is applicable to vehicles to control the direction of travel thereof.

FIG. 1 schematically illustrates a steering wheel according to an embodiment of the present invention. The steering wheel according to the embodiment of the present invention is described below with reference to FIG. 1.

As shown in FIG. 1, provided in the present invention is a steering wheel 100. The steering wheel 100 comprises a steering wheel rim 110 and a steering wheel center support 120. The steering wheel rim 110 is rotatable relative to the steering wheel center support 120. The steering wheel center support 120 is to be connected to a steering column of a vehicle. It should be noted that rotation of the steering wheel rim 110 relative to the steering wheel center support 120 comprises rotation of the steering wheel rim 110 about a first axis of rotation A1 and about a second axis of rotation A2 relative to the steering wheel center support 120. Specifically, in FIG. 1, the first axis of rotation A1 is substantially perpendicular to the plane of the paper, and in other words, is perpendicular to the plane in which the steering wheel rim 110 is located. It can be understood that the rotation of the steering wheel rim 110 about the first axis of rotation A1 is used for setting a desired direction of travel of the vehicle (i.e., steering of the vehicle). The second axis of rotation A2 is perpendicular to the first axis of rotation A1, and is specifically a pivot axis of a fixed shaft 150. The rotation of the steering wheel rim 110 about the second axis of rotation A2 is used for configuring the steering wheel 100 to be in a stowed state, thereby reducing occupied space.

As shown in FIG. 1, in addition to the steering wheel rim 110 and the steering wheel center support 120, the steering wheel 100 of the present invention further comprises a pivot shaft 130 and the above-mentioned fixed shaft 150. The pivot shaft 130 is configured so that a first end (i.e., the left end in FIG. 1) is fixedly connected to the steering wheel rim 100 so as to move together with the steering wheel rim 110. Pivoting of the pivot shaft 130 about the second axis of rotation A2 causes the steering wheel rim 110 to rotate about the second axis of rotation A2 relative to the steering wheel center support 120. Moreover, the steering wheel 100 of the present invention further comprises a transmission mechanism 140. The transmission mechanism 140 is used to transmit a driving force of a driving apparatus 160 to the pivot shaft 130, and specifically drive, at a second end (i.e., the right end in FIG. 1) of the pivot shaft 130, the pivot shaft 130 so as to cause same to rotate about the second axis of rotation A2, which will be described in detail below with reference to other accompanying drawings.

Optionally, the steering wheel rim 110 comprises two spokes integrally formed therewith, and the two spokes are disposed 180 degrees apart on the same straight line. The spokes are located between the steering wheel rim 110 and the steering wheel center support 120 so as to be used to connect the steering wheel rim 110 and the steering wheel center support 120. Moreover, respective ends of the pivot shaft 130 and the fixed shaft 150 are fixedly connected to the spokes of the steering wheel rim 110.

Figure 2:
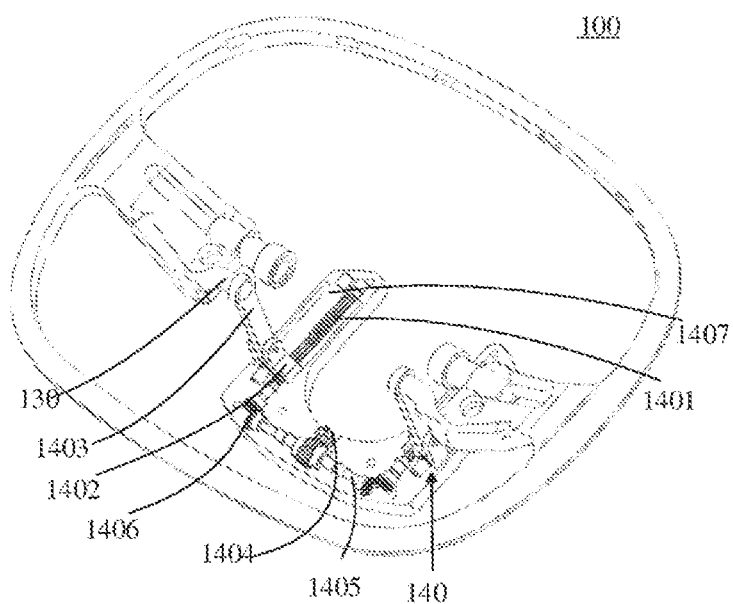
FIG. 2 and FIG. 3 respectively schematically illustrate a steering wheel according to a first embodiment of the present invention, wherein the steering wheel shown in FIG. 2 is in a first state, and the steering wheel shown in FIG. 3 is in a second state.
Figure 3:
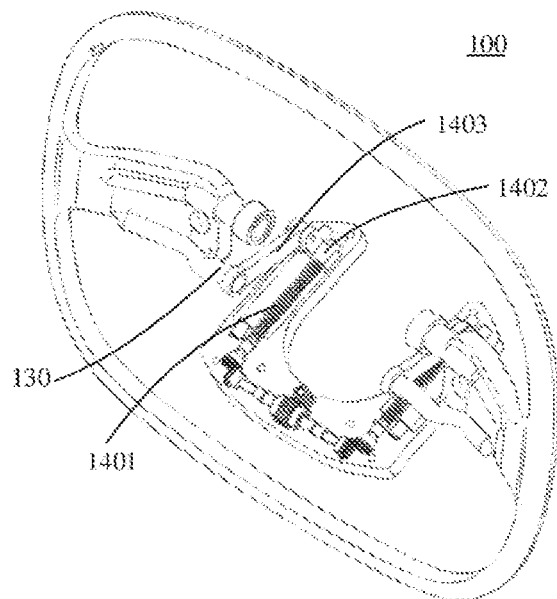

FIG. 2 and FIG. 3 respectively schematically illustrate a steering wheel according to a first embodiment of the present invention, wherein the steering wheel shown in FIG. 2 is in a first state, and the steering wheel shown in FIG. 3 is in a second state. The first state may be understood as a conventional working state in which the steering wheel can be used to steer the vehicle to turn, and the second state may be understood as the stowed state of the steering wheel. The steering wheel according to the first embodiment of the present invention is further described below with reference to FIG. 2 and FIG. 3.

As shown in FIG. 2 and FIG. 3, each transmission mechanism 140 comprises a lead screw 1401, a slider 1402, and a connecting rod 1403. The sliders 1402 are configured to be disposed on the lead screws 1401 by being threadedly engaged with the lead screws 1401. When the lead screws 1401 rotate, the sliders 1402 are driven, by means of the threaded engagement between the lead screws 1401 and the sliders, to slide in the axial direction of the lead screws 1401. For example, the sliders 1402 slide from one end of the lead screws 1401 shown in FIG. 2 to the other end of the lead screws 1401 shown in FIG. 3, so as to cause the steering wheel 100 to enter the stowed state. In addition, one end of each connecting rod 1403 is connected to the second end of a pivot shaft 130 in a manner of being rotatable relative to the pivot shaft 130 (e.g., connected to the pivot shaft as a sleeve), and the other end of each connecting rod 1403 is connected to a slider 1402 in a manner of being rotatable relative to the slider 1402 (e.g., hinged). Sliding of the sliders 1402 on the lead screws 1401 causes the ends of the connecting rods 1403 connected to the sliders 1402 to slide on the lead screws 1401 together with the sliders 1402, and meanwhile causes the other ends of the connecting rods 1403 to rotate about the second axis of rotation A2, thereby driving the pivot shafts 130 connected together with the rotating ends of the connecting rods 1403 to likewise rotate about the second axis of rotation A2. Therefore, in the steering wheel 100 of the present invention, the driving force drives, via the lead screws 1401, the sliders 1402, and the connecting rods 1403, the pivot shafts 130 to rotate about the second axis of rotation A2.

As an embodiment of the present invention, as shown in FIG. 2 and FIG. 3, each transmission mechanism 140 further comprises a transmission shaft 1405. The transmission shafts 1405 are used to receive a driving force, and are drivingly connected to the lead screws 1401, the axes thereof not being parallel, particularly being perpendicular to each other. Optionally, two lead screws 1401 are provided, and are respectively drivingly connected to the transmission shaft 1405 at two shaft ends thereof (the left end and the right end in FIG. 2) by means of a bevel gear pair 1406. As an alternative embodiment, two lead screws 1401 are provided, and are respectively drivingly connected to the transmission shaft 1405 at two shaft ends thereof by means of a universal joint (not shown). As an alternative embodiment, two lead screws 1401 are provided, and are respectively drivingly connected to the transmission shaft 1405 at two shaft ends thereof by means of a helical gear pair (not shown). It should be noted that providing two lead screws facilitates uniform transmission of power on the steering wheel. Moreover, directions of rotation of the two lead screws when driven by the transmission shaft are opposite to each other, resulting in a self-locking function to prevent the steering wheel rim from rotating undesirably and accidentally relative to the steering wheel center support.

In an example, the transmission shafts 1405 are specifically worms, and each transmission mechanism 140 further comprises a worm gear 1404. Each worm gear 1404 is configured to be drivingly connected to an output shaft of a driving apparatus 160. The driving apparatus 160 is, for example, a motor. However, this is merely an example. For example, the common motor, the worm gear, and the worm may be replaced with a double-head motor.

In an example, the steering wheel center support 120 is provided with a box body 180 for accommodating the transmission mechanisms 140, and the box body 180 comprises, for example, a container cover and a base for defining an accommodating space. In addition, the pivot shafts 130 are located at an outer side of the box body 180. Furthermore, a portion of the connecting rods 1403 is likewise located at the outer side of the box body 180. In order not to interfere with movement of the connecting rods 1403, the box body 180 is provided with notches for movement of the connecting rods 1403. The notches are clearly shown in FIG. 1, i.e., two slot-shaped notches located on the left and right sides of the container cover of the box body 180.

In an example, the driving apparatus 160 (e.g., a motor) is disposed on an outer top surface of the box body 180. It should be noted that the direction and position of each component of the steering wheel herein are based on the direction and position of the vehicle, i.e., the width direction of the vehicle being the left-to-right direction, the length direction of the vehicle being a front-to-rear direction, and the height direction of the vehicle being an up-and-down direction, so that a top surface of the box body refers to a side surface of an upper portion of the box body in the up-and-down direction when the steering wheel is mounted in the vehicle.

In an example, the steering wheel 100 further comprises side plates 170 disposed on the outer top surface of the box body 180, and each side plate 170 is provided with a track 1701 for movement of the second end of a pivot shaft 130. Moreover, each side plate 170 is further provided with a positioning hole 1702. One end of the fixed shafts 150 is fixedly connected to the steering wheel rim 110, and the other end relatively rotatably extends into a positioning hole 1702 in a side plate 140. Optionally, the side plates may be welded to the box body. Optionally, the side plates may be integrally formed with the steering wheel center support, and a pressing plate is connected to an upper edge of the side plates so as to define the above-described track and positioning hole together with the side plates.

Please continue to refer to FIGS. 2 and 3. To support the sliders 1402 and guide the sliders 1402, in embodiments of the present invention, each transmission mechanism 140 further comprises a guide shaft 1407 arranged to be parallel to a lead screw 1401, and each slider 1402 comprises a left engagement hole and a right engagement hole, i.e., a first engagement hole and a second engagement hole. The first engagement hole is configured to be a threaded hole so as to be threadedly engaged with a lead screw 1401, and the second engagement hole is configured to traverse a guide shaft 1407. It can be understood that this advantageously ensures that the sliders are reliably supported and guided.

Figure 4:
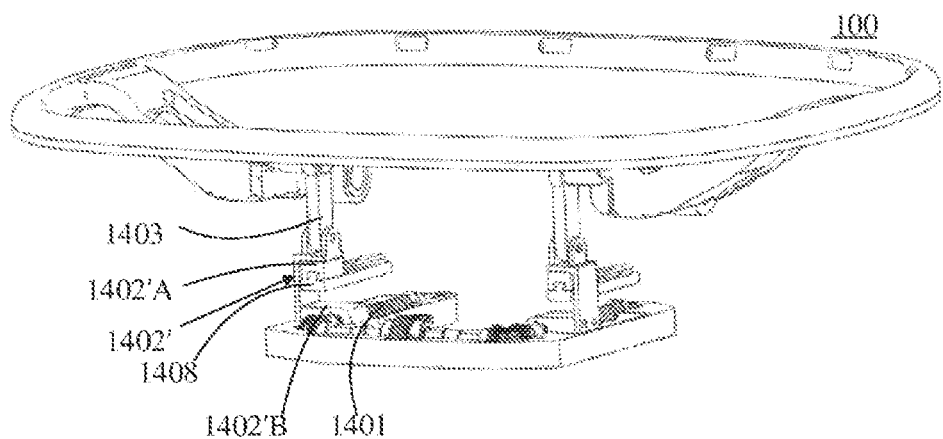
FIG. 4 and FIG. 5 schematically illustrate a steering wheel according to a second embodiment of the present invention, wherein the steering wheel shown in FIG. 4 is in a first state, and the steering wheel shown in FIG. 5 is in a second state.
Figure 5:
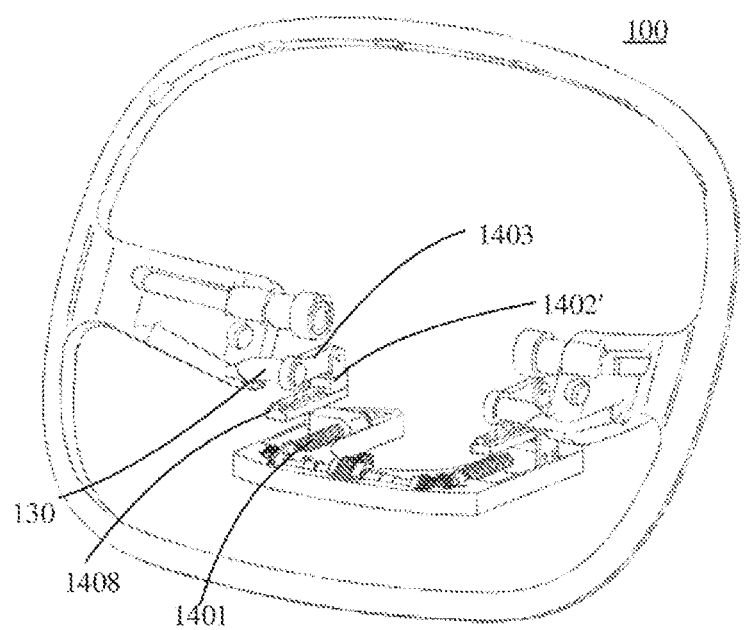

FIG. 4 and FIG. 5 schematically illustrate a steering wheel according to a second embodiment of the present invention, wherein the steering wheel shown in FIG. 4 is in a first state, and the steering wheel shown in FIG. 5 is in a second state. The steering wheel according to the second embodiment of the present invention is described below with reference to FIG. 4 and FIG. 5.

The second embodiment of the present invention mainly differs from the first embodiment of the present invention as follows. As an alternative embodiment of the guide shafts 1407, each transmission mechanism 140 comprises a guide rail 1408 arranged to be parallel to a lead screw 1401, and each slider 1402' comprises an engagement hole and an opening which are arranged up and down, i.e., a first engagement hole and a first opening. The first engagement hole is configured to be a threaded hole so as to be threadedly engaged with a lead screw 1401, and the first opening is configured to be disposed on a side surface (specifically, an upper side surface) of a guide rail 1408 in a shape interlocking manner. That is, each slider 1402' comprises a first portion 1402'A and a second portion 1402'B arranged up and down and spaced apart from each another. A lower side of the first portion 1402'A is provided with a dovetail slot. The second portion 1402'B is provided with a threaded hole. An upper side of each guide rail 1408 is provided with a dovetail portion complementary to the dovetail slot in shape. When the dovetail slot of the first portion 1402'A of the slider 1403 is positioned on the dovetail portion of the guide rail 1408, due to mating between the dovetail slot and the dovetail portion, the slider 1402'A and the guide rail 1408 cannot be separated from each other in the thickness direction or the width direction of the guide rail 1408 (the up-and-down direction and the left-to-right direction shown in FIG. 4 and FIG. 5), but can only move relatively in the length direction of the guide rail 1408.

Optionally, the above-described first and second embodiments of the present invention may be combined. That is, each transmission mechanism comprises both the guide shafts and the guide rails arranged to be parallel to the lead screws. In this case, each slider may be configured to comprise a first portion, a second portion, and a third portion. The first portion and the second portion are arranged up and down, and the second portion and the third portion are arranged left and right. A lower side of the first portion is provided with a dovetail slot, and the upper side of the guide rail is provided with a dovetail portion complementary to the dovetail slot in shape. The second portion comprises a first engagement hole. The first engagement hole is configured to be a threaded hole so as to be threadedly engaged with the lead screw. The third portion comprises a second engagement hole. The second engagement hole is configured to traverse the guide shaft. Certainly, the first portion, the second portion, and the third portion described above may have relative directions and positions different from those described above.

As an embodiment of the present invention, each fixed shaft is configured to be a hollow shaft, and a wire harness in the steering wheel may be accommodated in a cavity of the fixed shaft.

Those skilled in the art could understand that although in the above embodiment, the steering wheel rim is described as being provided with two spokes integrally formed therewith, and a lead screw-slider-connecting rod-pivot shaft is disposed on each of the two spokes, this is merely an example, and the steering wheel of the present invention is not limited thereto. According to actual conditions (e.g., in consideration of personalized space utilization requirements of users), different configurations can be made. For example, it is possible to provide only one spoke, and for another example, it is possible to directly provide the lead screw-slider-connecting rod-pivot shaft on a circumferentially extending portion of the steering wheel rim.

A stowing process of the steering wheel according to the present invention is described below.

By means of the driving force, each lead screw 1401 rotates. The slider 1402/1402'B is driven, by means of the threaded engagement between the lead screw 1401 and the slider, to slide in the axial direction of the lead screw 1401. Specifically, the slider 1402/1402'B slides from one end of the lead screw 1401 shown in FIG. 2 or FIG. 4 to the other end of the lead screw 1401 shown in FIG. 3 or FIG. 5. Sliding of the slider 1402/1402'B on the lead screw 1401 causes the end of the connecting rod 1403 connected to the slider 1402/1402'B to slide on the lead screw 1401 together with the slider 1402/1402'B, and meanwhile causes the other end of the connecting rod 1403 to rotate about the second axis of rotation A2, thereby driving the pivot shaft 130 connected together with the rotating end of the connecting rod 1403 to likewise rotate about the second axis of rotation A2, therefore causing the steering wheel 100 to enter the stowed state. When the steering wheel 100 is in the stowed state, the steering wheel rim 110 is folded relative to the steering wheel center support 120 so that the steering wheel 100 occupies less space as a whole. In this case, the steering wheel 100 is not used to control the direction of travel of the vehicle, and in this case, a driver does not need to be involved in driving of the vehicle all the time, so that the driver may transfer their attention to an item of interest or have a rest. Therefore, in this case, the steering wheel rim is folded, and the steering wheel is thus stowed, thereby providing more space and comfort to the driver.

It should be noted that, in the steering wheel of the present invention, the steering wheel rim 110 is not limited to being rotatable in the direction shown in FIG. 3 and FIG. 5 relative to the steering wheel center support 120. That is, the steering wheel rim 110 is not limited to being folded forwards relative to the steering wheel center support 120. For example, the steering wheel rim 110 may also be configured to be rotatable in a direction opposite to the direction of rotation shown in FIG. 3 and FIG. 5 relative to the steering wheel center support 120, i.e., rotating rearwards relative to the steering wheel center support 120. To that end, the structural member for transmitting the driving force to a lead screw may be disposed at the opposite end of the lead screw. Specifically, the transmission shaft 1405 disposed at a front end of each lead screw 1401 shown in FIG. 1 to FIG. 5 may be disposed at a rear end of the lead screw 1401. Therefore, the structural member for transmitting the driving force to the lead screw 1401 is disposed at a front end or a rear end of the steering wheel center support, thereby achieving different directions of rotation of the steering wheel rim relative to the steering wheel center support.

Therefore, in the steering wheel of the present invention, by means of configuring the lead screw-slider-connecting rod to transmit the driving force to the pivot shaft, rotation of the steering wheel rim may be achieved. The steering wheel of the present invention is stowable and has a simple structure and low costs.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel, comprising a steering wheel rim and a steering wheel center support, the steering wheel rim being rotatable relative to the steering wheel center support, and the steering wheel rim being mounted so as to be rotatable about a first axis of rotation, wherein, the steering wheel further comprises, a pivot shaft, configured so that a first end is fixedly connected to the steering wheel rim so as to move together with the steering wheel rim, pivoting of the pivot shaft about a second axis of rotation causing the steering wheel rim to rotate about the second axis of rotation relative to the steering wheel center support, wherein the first axis of rotation is perpendicular to the second axis of rotation; and a transmission mechanism, comprising a lead screw, a slider, and a connecting rod, the slider being configured to be disposed on the lead screw by being threadedly engaged with the lead screw, one end of the connecting rod being connected to a second end of the pivot shaft so as to be able to rotate relative thereto, the other end of the connecting rod being connected to the slider so as to be able to rotate relative thereto, and a driving force, via the lead screw, the slider, and the connecting rod, driving the pivot shaft to rotate about the second axis of rotation.

2. The steering wheel according to claim 1, wherein the transmission mechanism comprises a transmission shaft for receiving a driving force, and the transmission shaft is drivingly connected to the lead screw, the axes of the two not being parallel.

3. The steering wheel according to claim 2, wherein two lead screws are provided and are respectively drivingly connected to the transmission shaft at two shaft ends thereof by means of a bevel gear pair.

4. The steering wheel according to claim 3, wherein the steering wheel center support is provided with a box body for accommodating the transmission mechanism, and the pivot shaft is located at an outer side of the box body.

5. The steering wheel according to claim 4, wherein the transmission mechanism further comprises a guide shaft arranged to be parallel to the lead screw, and the slider comprises a first engagement hole and a second engagement hole, wherein the first engagement hole is configured to be a threaded hole so as to be threadedly engaged with the lead screw, and the second engagement hole is configured to traverse the guide shaft.

6. The steering wheel according to claim 5, wherein the transmission mechanism further comprises a worm gear and a worm, the worm gear being configured to be drivingly connected to an output shaft of a driving apparatus, and the worm being used as the transmission shaft.

7. The steering wheel according to claim 4, wherein the transmission mechanism further comprises a guide rail arranged to be parallel to the lead screw, and the slider comprises a first engagement hole and a first opening, wherein the first engagement hole is configured to be a threaded hole so as to be threadedly engaged with the lead screw, and the first opening is configured to be disposed on a side surface of the guide rail in a shape interlocking manner.

8. The steering wheel according to claim 4, wherein the driving apparatus is disposed on an outer top surface of the box body.

9. The steering wheel according to claim 8, wherein the steering wheel further comprises side plates disposed on the outer top surface of the box body, and each side plate is provided with a track for movement of the second end of the pivot shaft.

10. The steering wheel according to claim 9, wherein the steering wheel further comprises a fixed shaft disposed to be parallel to the pivot shaft, one end of the fixed shaft being fixed on the steering wheel rim, and the other end extending into a positioning hole in a side plate so as to rotate relative thereto.

11. The steering wheel according to claim 10, wherein the fixed shaft is configured to be a hollow shaft.

12. The steering wheel according to claim 10, wherein two lead screws are provided.

* * * * *